United States Patent [19]  [11] 4,309,235
Mallory et al.  [45] Jan. 5, 1982

[54] RETRACTABLE BEAD SETTER ASSEMBLY AND METHOD OF OPERATION THEREOF

[75] Inventors: Edwin E. Mallory, Niles, Mich.; Hugh Bourassa, University Heights, Ohio

[73] Assignee: National-Standard Company, Niles, Mich.

[21] Appl. No.: 167,037

[22] Filed: Jul. 9, 1980

[51] Int. Cl.³ .............................................. B29H 17/24
[52] U.S. Cl. ....................................... 156/131; 156/403
[58] Field of Search ............... 156/126, 131, 132, 401, 156/403, 398

[56] References Cited

U.S. PATENT DOCUMENTS

| | | | |
|---|---|---|---|
| 3,844,177 | 10/1974 | Bourassa | 74/89.15 |
| 3,944,456 | 3/1976 | Cantarutti | 156/398 |
| 4,048,002 | 9/1977 | Mallory | 156/403 |
| 4,120,714 | 10/1978 | Colombani et al. | 156/131 |
| 4,148,680 | 4/1979 | Harding | 156/403 |

Primary Examiner—John E. Kittle
Attorney, Agent, or Firm—Emrich, Root, Lee, Brown & Hill

[57] ABSTRACT

A retractable bead setter assembly of the present invention for use with a tire building machine is comprised of a tire bead placing and end ply turn-up bag pusher means having a plurality of first segment elements movable radially therein and a plurality of alternately spaced second segment elements movable both radially and axially. The bead portion of the bead and filler material is positioned adjacent to the first segment elements and firmly gripped between the first and second segment element. The tire bead placing and end ply turn-up bag pusher means is axially moved inwardly to an inward bead set position perpendicular to the axis of rotation of the tire building machine and the clamp lock means is expanded radially to lock the tire carcass material to the bead.

9 Claims, 9 Drawing Figures

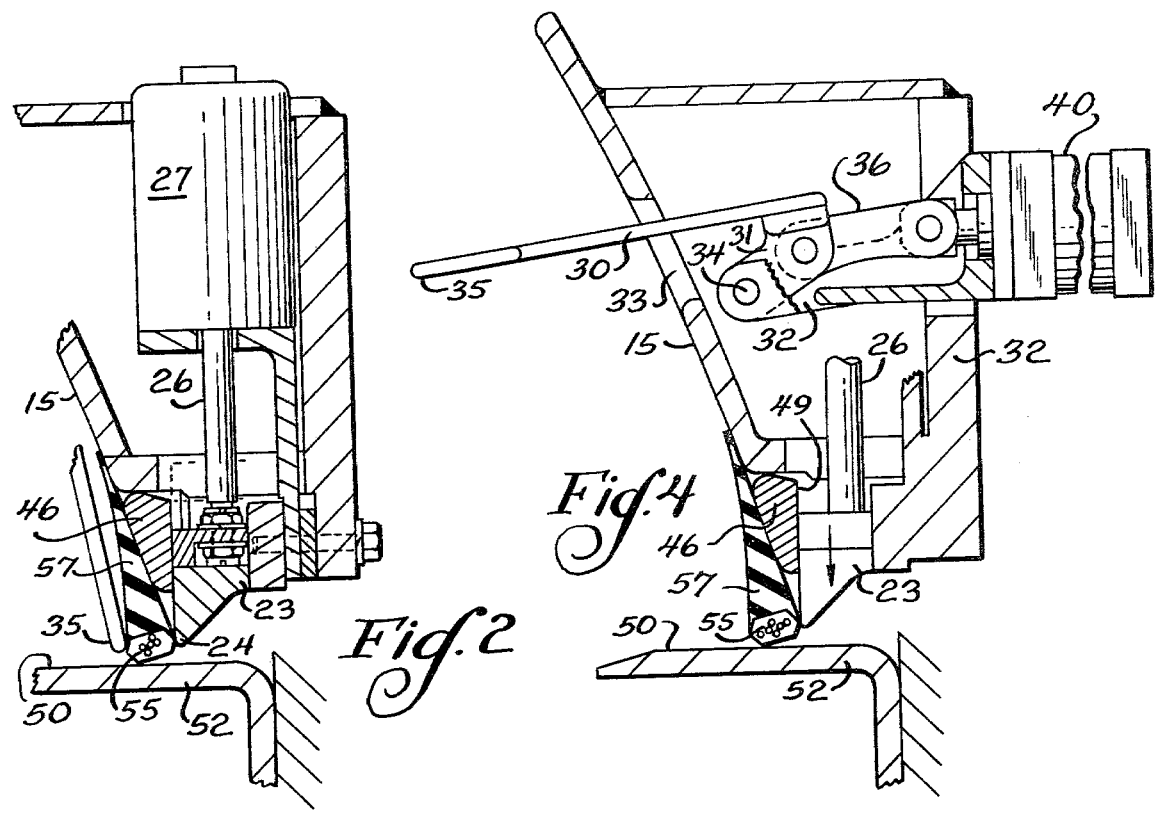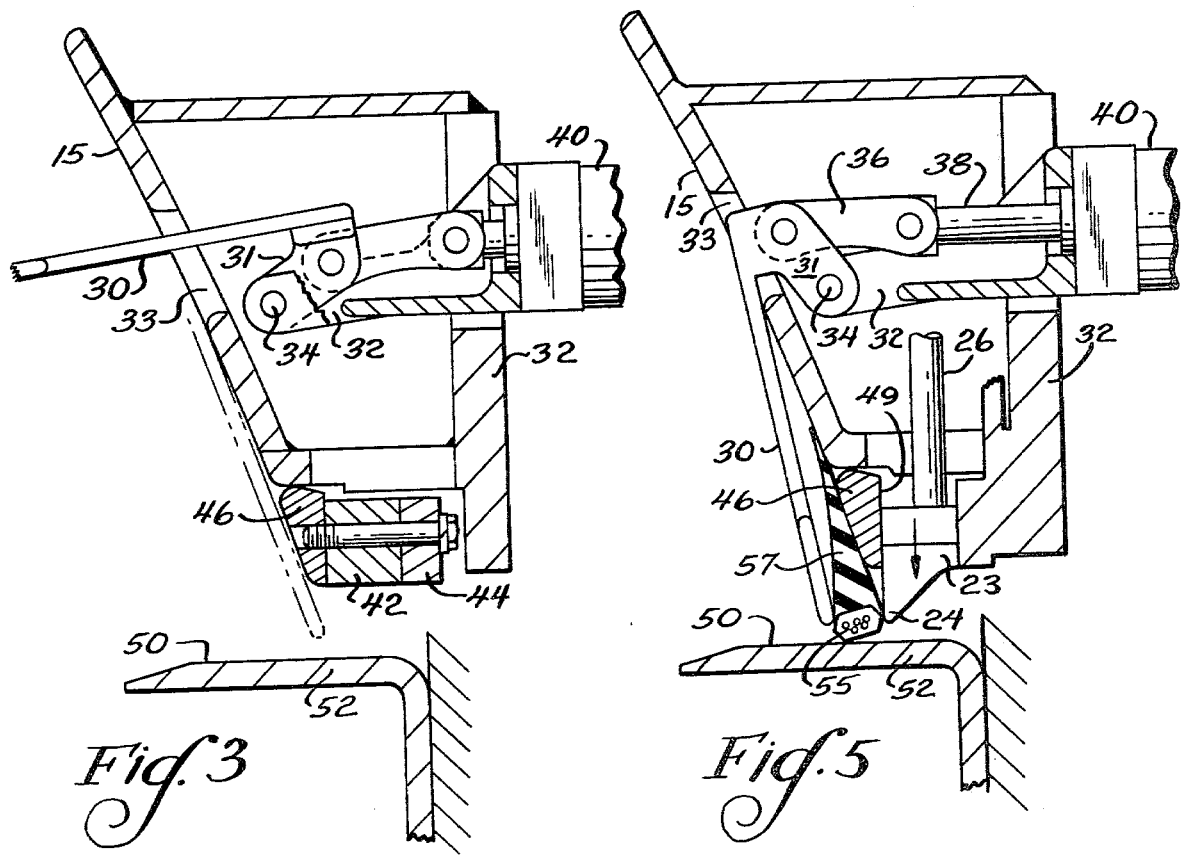

RETRACTABLE BEAD SETTER ASSEMBLY AND METHOD OF OPERATION THEREOF

BACKGROUND OF THE INVENTION

The present invention relates to axially and radially adjustable means for firmly gripping the bead and filler material and to means for positioning the bead and filler material perpendicular to the axis of rotation of a tire building machine as the clamp lock means lock the beads to the tire carcass in the tire building machine.

In the past, it has been the practice in the use of tire building machines to apply the tire carcass material in cylindrical form about the tire building drum and then position the tire bead substantially concentrically to the drum while expanding the clamp lock means on the tire building machine. Such positioning has included the use of split rings, magnets and register rings to move the bead and approximate its location with respect to the clamp lock means on the tire building machine. However, it has been found that such positioning of the tire bead, although sometimes providing for the manufacture of uniform and cylindrical tires with the tire beads being positioned approximately equal distance from the center-line of the tire, fails to consistently provide a method of building tires which results in uniform tire construction.

Moreover, the utilization of a combination of bead and filler material in building tires has rendered these mechanical devices inapplicable. One solution to the problem of aligning the tire bead and filler material circumferentially about a tire carcass is suggested by U.S. Pat. No. 4,148,680. In this patent, a member having a plurality of suction cups therein engages the uncured filler material on the bead to somehow hold and retain the bead and filler material while the bead is positioned over the clamp lock means of a tire building machine. However, because the uncured filler material is easily deformed, such a device which utilizes suction cups to engage and hold only the easily deformed bead filler material fails to properly maintain the bead portion of the bead and filler material perpendicular to the axis of rotation of the tire building apparatus. Such inconsistencies in the proper alignment of the bead to the clamp lock means on a tire building machine results in the production of tires wherein the tire beads are not uniformly spaced from the center-line of the tire.

SUMMARY OF THE INVENTION

It is the primary object of the present invention to afford a novel retractable bead setter assembly for use in conjunction with a tire building machine.

A further object of the present invention is to provide a novel retractable bead setting assembly for use in conjunction with a tire building machine wherein the bead portion of the bead and filler material is gripped firmly by the bead setter assembly and positioned in a plane perpendicular to the axis of rotation of the tire building machine an equal distance from the center-line of the tire building machine expandable drum as the clamp lock means of the tire building machine is radially expanded to engage and hold the bead and filler material.

It is another object of the present invention to provide a retractable bead setting assembly wherein the bead setting and locating apparatus is mounted upon ply turn-up bag pusher means for use in conjunction with a tire building machine.

It is still a further object of the present invention to provide a novel retractable bead setting apparatus for use in conjunction with a tire building machine wherein a bead or the bead portion of the bead and filler material is mounted to the bead setting apparatus and firmly clamped against a retractable surface by hinged segment elements, which assembly then moves inwardly to an inward bead set position to align the bead or the bead portion of the bead and filler material axially with respect to the clamp lock means of the tire building machine in a plane perpendicular to the axis of rotation of the tire building machine.

The retractable bead setter assembly of the present invention is comprised of a tire bead placing and end ply turn-up bag pusher means which is arranged for axial inward and outward movement longitudinally of the expandable drum means of a tire building machine. The tire bead placing and end ply turn-up bag pusher means is comprised of an end ply turn-up bag pusher wall or surface and a frame mounting means operatively connected to an axial movable member. The specific arrangement for the associated axial inward and outward movement of the retractable bead setter assembly of the present invention does not form part of the present invention and may be of a construction as shown and described in U.S. Pat. No. 4,048,002, issued in the name of Edwin E. Mallory, in U.S. Pat. No. 3,844,177, issued in the name of Hugh Bourassa, and in the copending applications of Emerson C. Bryant, Ser. Nos. 87,876, filed Oct. 24, 1979, and 129,595, filed Mar. 12, 1980, all of the above identified patents and applications assigned to the assignee of the present invention. Generally, it can be said that the retractable bead setter assembly is mounted for axial inward and outward movement longitudinally of the expandable drum portion of the tire building apparatus, as is known in the art.

The tire bead placing and end ply turn-up bag pusher member and turn-up wall surface includes therein a plurality of first segment portions or means movable at least radially therein with alternating second segment portions or means movable both radially and axially with respect to the first segmented portions. Four first segment portions are provided with an alternating spaced four second segment portions on each end ply turn-up bag pusher means. It should be remembered that only one retractable bead setter assembly will be discussed and there is provided a symmetrical retractable bead setter assembly on the opposite end of a tire building machine, having identical parts, for the precise positioning of the bead or the bead portion of the bead and filler material onto the clamp lock means located on the opposite side of the center-line of the tire carcass material. The first segment portions are comprised of an arcuate shaped segment elements, having a projection portion thereon, which are axially movable by and operatively connected to a piston member which is pneumatically operated by an air cylinder or other device. The second segment portions are comprised of T-shaped paddles or finger elements which are pivotally mounted within the tire bead placing and end ply turn-up bag pusher means and operatively connected to an air cylinder or other device for the pivotal movement of the paddle through an opening in the turn-up wall surface such that the paddle is movable both radially and axially with respect to the first segment elements. Positioned below each of the openings in the turn-up wall in the end ply turn-up bag pusher member are a preassembled spacer and mounting for an annular hub member which provides an extended surface for the end ply turn-up bag pusher wall surface, as well as providing an extended surface for defining the axial position of the first segment elements as they move between an inward extended position to an outward retracted position. The first segment elements include a projection portion on the end thereof which cooperates with an outer annular surface of an annular bead fixture ring, as will be hereinafter described.

The second segment elements or T-shaped paddles are movable between a retracted position wherein the end of the second segment elements extend outwardly through an opening in the turn-up wall to an actuated position wherein the hinged paddle is radially and axially moved to a position wherein the end portions of the T-shaped paddles engage the bead or the bead portion of the bead and filler material to firmly grip and retain the bead or the bead portion of the bead and filler material against the projection portion of the first segment elements. Positioned radially inwardly from the retractable bead setter assembly is a stationary annular bead fixture ring having an outer annular surface thereon which is adapted to cooperate with the projection portion of the first segment elements to receive the bead or the bead and filler material for each operation of the assembly.

The operation of the retractable bead setter assembly in accordance with the present invention may be described as follows. The tire bead placing and end ply turn-up bag pusher means is positioned in its axial outer position with the first segment elements and the projections thereon in their inward extended position wherein the projections are adjacent to and cooperate with the outer surface of the annular bead fixture ring. Either before or after the tire carcass material has been positioned about the tire building apparatus, the bead and/or bead and filler material is positioned against the extended first segment element and over the outer annular surface of the annular bead fixture ring. When the bead and filler material is so positioned, the hinged second segment elements or T-shaped paddles are moved radially and axially such that the ends thereof firmly engages and grips the bead or the bead portion of the bead and filler material to hold the same against the projection portion of the first segment elements. When the bead has been so positioned and firmly retained against the first segment elements, the retractable bead setter assembly is axially moved inwardly to an inward bead set position wherein the bead and filler material is aligned over the clamp lock means of the tire building machine. Upon the expansion of the clamp lock means to engage the tire carcass material and clamp it to the precisely aligned bead and/or bead and filler material, the bead and/or bead and filler material is rigidly retained and aligned in a plane perpendicular to the axis of rotation of the tire building machine and an equal distance from the center-line of the expandable drum.

After the bead and/or bead and filler material has been firmly clamped and retained by the clamp lock means on the tire building machine, the first segment elements are moved axially from their extended inward position to their retracted outward position and the hinged paddles or second segment elements are radially and axially moved to their outward retracted position to thereby release its grip on the bead and/or bead and filler material. Thereafter, the retractable bead setter assembly is returned axially outwardly to a position surrounding the outer annular surface of the stationary annular bead fixture ring. Then, the first segment elements are moved axially inwardly adjacent the outer surface of the annular bead fixture ring to ready the tire building machine for the placement of the bead and/or bead and filler material thereon for the next cycle of operation.

The novel and useful retractable bead setter assembly in accordance with the present invention provides an apparatus for predeterminely positioning a bead or a bead and filler material in an inward bead set position over the expanding clamp lock means of a tire building machine. The precise location of the bead and/or bead and filler material in the predetermined inward bead set position is accomplished by the firm engagement and holding of the bead or the bead portion of the bead and filler material and the precise inward axial movement of the retractable bead setter assembly with respect to the clamp lock means. The proper alignment of the bead and/or bead and filler material with respect to the expanding clamp lock means of the tire building machine results in the production of tires having tire beads parallel to each other and uniformly positioned equal distance from the center-line of the tire and insures consistent manufacture of uniform and cylindrical tires.

DESCRIPTION OF THE DRAWINGS

FIG. 2 is a cross-sectional view taken along the line 2—2 of FIG. 1 illustrating the first segment portions in their inward extended position in accordance with the present invention;

FIG. 3 is a cross-sectional view taken along line 3—3 of FIG. 1 illustrating the second segment portions in their outward retracted position in accordance with the present invention;

FIG. 4 is a cross-sectional view taken along line 4—4 of FIG. 1 illustrating the positioning of a bead and filler material against the first segment portion positioned in its inward extended position and the second segment portion positioned in its outward retracted position in accordance with the present invention;

FIG. 5 is an axial cross-sectional view illustrating the positioning of the second segment portion radially and axially in its actuated inward position to engage and grip the bead portion of the bead and filler material in accordance with the present invention;

DETAILED DESCRIPTION

Figure 1:
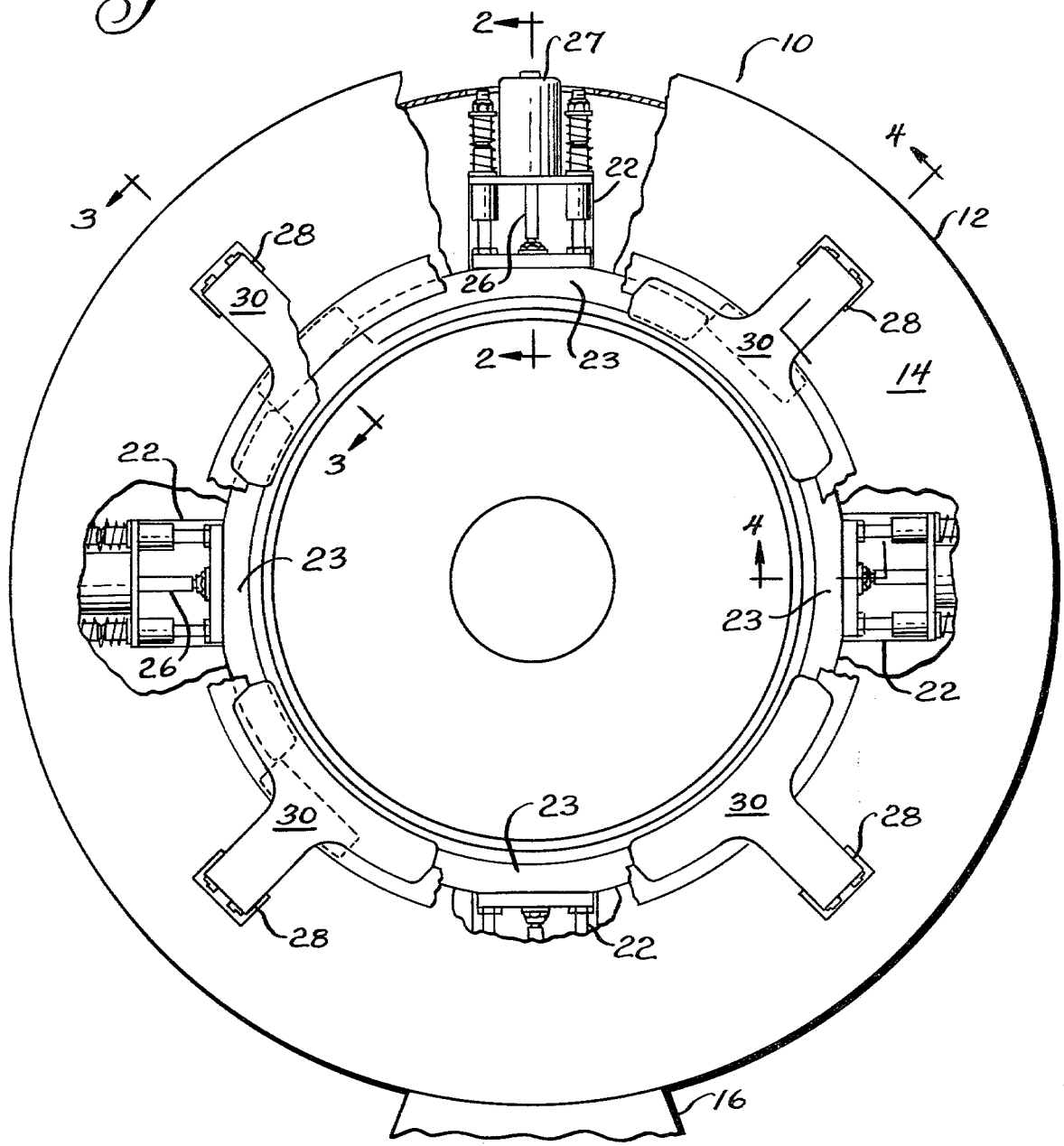
FIG. 1 is an end elevation view of a retractable bead setter assembly in accordance with the present invention with the end ply turn-up bag pusher member shown partially broken away to illustrate the operation of the first segment portions.
Figure 6:
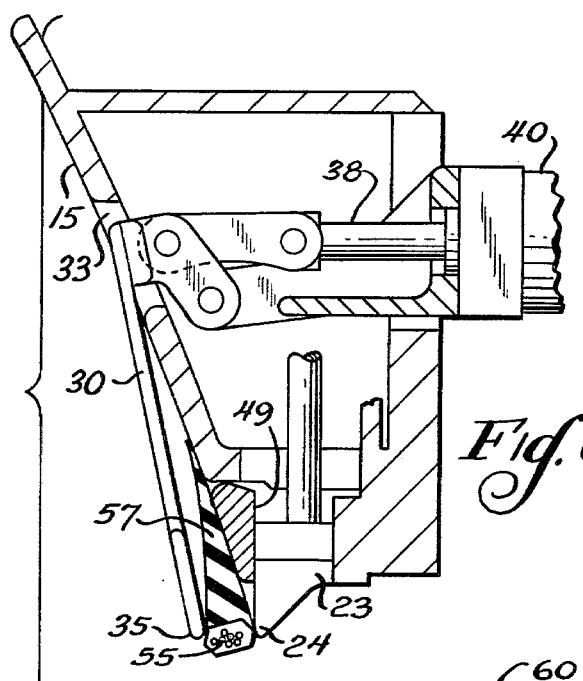
FIG. 6 is an axial cross-sectional view illustrating the positioning of the retractable bead setter assembly in an inward bead set position in register with the clamp lock means of a tire building machine in accordance with the present invention.
Figure 7:
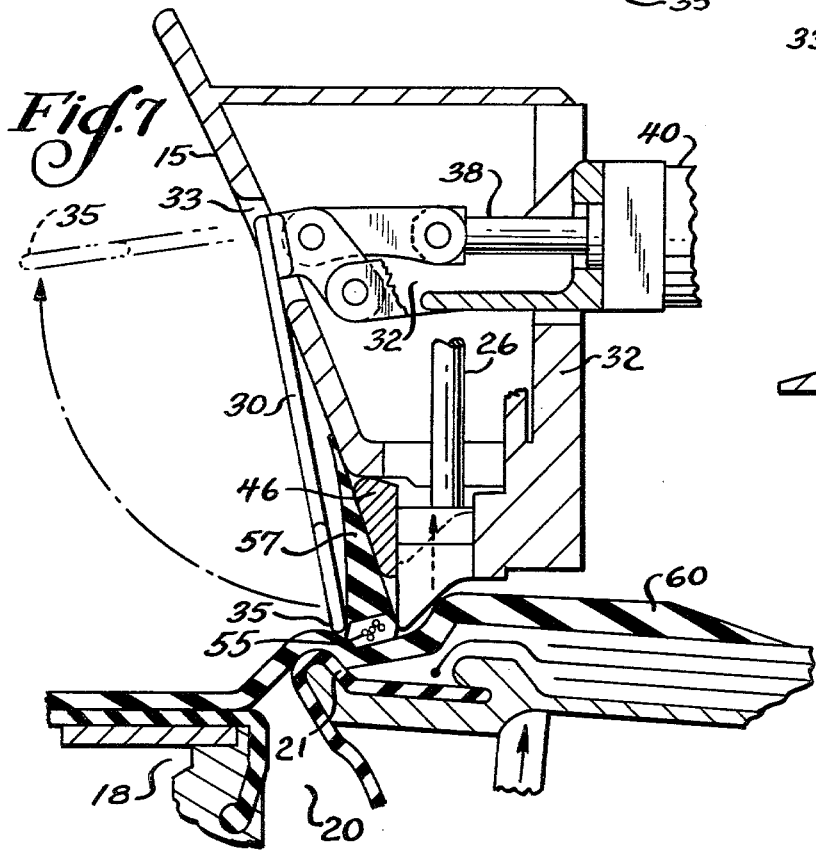
FIG. 7 is an axial cross-sectional view illustrating the expansion of the clamp lock means of the tire building machine to engage the tire carcass material and clamp it to the bead and filler material, with the movement of the first segment portion from its inward extended position to the outward retracted position and the movement of the second segment portion from its actuated inward position to its disengaged retracted position shown in dotted lines in accordance with the present invention.

Referring now to the drawings wherein like numerals have been used throughout the several views to designate the same or similar parts, there is shown in FIG. 1 a retractable bead setter assembly 10 which is comprised of a tire bead placing and end ply turn-up bag pusher means 12 arranged for axial inward and outward movement longitudingally of a central or intermediate expanding drum means 18 of a tire building apparatus or machine 20, partially shown in FIGS. 6 and 7. The tire bead placing and end ply turn-up bag pusher means 12 is comprised of an end ply bag turn-up wall 14 and a frame mounting means 16 operatively connected to an axial movable member, not shown. The specific arrangement for the associated axial movable member for axial inward and outward movement of the retractable bead setter assembly of the present invention does not form a part of the present invention and may be of a construction as shown or described in the aforesaid U.S. patent applications Ser. Nos. 87,876 and 129,595 and aforesaid identified U.S. Pat. Nos. 4,048,002 and 3,844,177. The retractable bead setting assembly 10 is mounted for axial inward and outward movement longitudinally of a central or intermediate expanding drum means 18 of a tire building apparatus 20, as partially shown in FIGS. 6 and 7, and is well known in the art.

The tire bead placing and end ply turn-up bag pusher member 14 and the turn-up wall surface 15 includes therein a plurality of first segment portions or means 22 movable at least radially therein with alternating second segment portions or means 28 movable both radially and axially with respect to the first segment portions or means 22. Four first segment portions 22 are provided with an alternating spaced four second segment portions 28 on each of the end ply turn-up bag pusher member 14. It should be noted that only one retractable bead setter assembly 10 will be discussed in the FIGURES and in the detailed description and there is provided on the opposite end of the tire building machine 20 a symmetrical retractable bead setter assembly 10 having identical parts for the precise positioning of the bead portion of the bead and filler material about a clamp lock means 21 located on the opposite side of the center-line of the tire carcass material 60.

Figure 8:
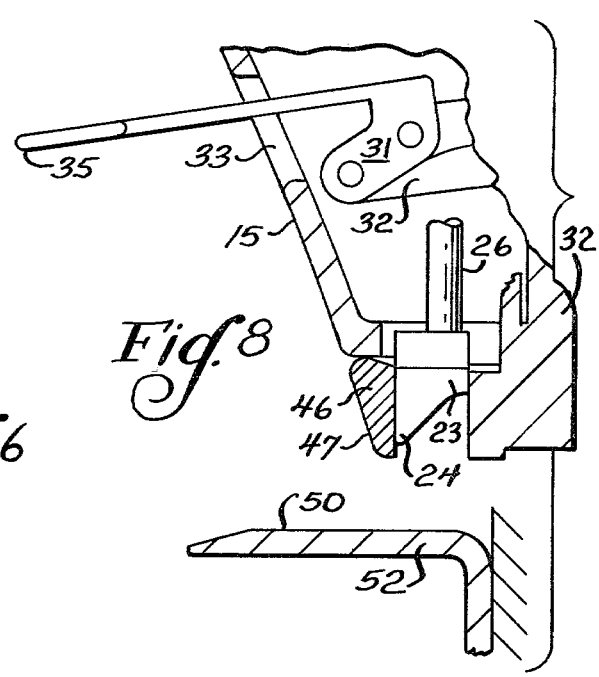
FIG. 8 is a fragmentary axial cross-sectional view of the retractable bead setter assembly positioned in its axial outer position surrounding the outer annular surface of the annular bead fixture ring with the first segment element in its outward retracted position in accordance with the present invention.

The first segment portions or means 22 are comprised of an arcuate shaped segment elements 23 having a projection portion 24 extending outwardly therefrom which elements are axially movable by and operatively connected to a piston member 26 which is pneumatically operated by an air cylinder 27 or other device. The second segment portions or means 28 are comprised of T-shaped paddles or finger elements 30 having a bent end portion 31 pivotally mounted to frame member 32 by fastening means 34 (FIGS. 3 and 4). The second segment means 28 are coupled to a piston member 38 pneumatically operated by an air cylinder 40 or other pneumatic actuated device by a linkage 36 for the pivotal movement of the paddle 30 through an opening 33 in the turn-up wall or surface 15 (FIGS. 5–7). Thus, the paddle 30 is movable both radially and axially with respect to the first arcuate segment elements 23. Positioned below each of the openings 33 in the turn-up wall 14 and attached to the frame member 32 are preassembled spacers 42 and preassembled mountings 44 for an annular hub member 46 (FIG. 3). The annular hub member 46 provides an extended surface 47 (FIGS. 3 and 9) for the end ply turn-up bag pusher wall surface 15, as well as providing an extended surface 49 (FIGS. 4–6) for defining the axial position of the arcuate segment elements 23 between an outward retracted position, a position as shown in FIG. 8, and an inward extended position, a position as shown in FIGS. 2, 4–7 and 9. The preassembled spacers 42 and mountings 44, hub member 46 and segment elements 23 and 30 are removable and replaceable to permit changes in the assembly 10 to accommodate various bead diameters. Such interchangeability permits the production of various sized tires by the tire building apparatus 20. The arcuate segment elements 23 include a projection portion 24 thereon which cooperates with an outer annular surface 50 of an annular bead fixture ring 52, as will hereinafter be described.

The T-shaped paddles 30 are movable between a retracted position wherein the end portion 35 (FIGS. 4 and 7–9) extends outwardly through the openings 33 and the turn-up wall 15 to an actuated position wherein the hinged paddle 30 is radially and axially moved to a position wherein the end portions 35 engage the bead portion 55 of the bead and filler material 57 to firmly grip and retain either the bead or the bead portion of the bead and filler material against the projection portion 24 of the arcuate segment elements 23, a position as shown in FIGS. 2 and 6. Positioned radially inwardly from the retractable bead setter assembly 10 is a stationary annular bead fixture ring 52 (FIGS. 2–5 and 8–9) having an outer annular surface 50 thereon which is adapted to cooperate with the projection portion 24 of the arcuate segment elements 23 to receive a bead or the bead and filler material 57.

To operate the retractable bead setter and clamp assembly 10, the tire bead placing and end ply turn-up bag pusher means 12 is positioned in its axial outer position with the first segment element 23 and the projections 24 thereon in their inward extended position and wherein the projections are adjacent to and cooperate with the outer surface of the stationary annular bead fixture ring, a position as shown in FIG. 6. Either before or after the tire carcass material 60 has been positioned about the tire building apparatus 20, a bead 55 or a bead and filler material 57 is placed or positioned against the extended first segment element 23 and over the outer annular surface of the annular bead fixture ring with the bead and filler material being substantially concentric to elements 23, a position as shown in FIG. 4. When the bead and/or bead and filler material is so positioned, the hinged second segment elements or T-shaped paddles 30 are moved radially and axially such that the ends 35 thereof firmly engages and grips the bead portion 55 of the bead and filler material 57 to hold the same against the projection portion 24 of the first segment elements 23, a position as shown in FIG. 5. When the bead portion 55 has been so positioned and firmly retained against the first segment elements 23, the retractable bead setter assembly is axially moved inwardly to an inward bead set position wherein the bead and filler material is aligned over the clamp lock means 21 of the tire building machine 20, a position as shown in FIG. 6. Upon the expansion of the claim lock means 21 to engage the tire carcass material and clamp it to the precisely aligned bead and filler material 57, the bead and/or bead and filler material is rigidly retained and aligned in a plane perpendicular to the axis of rotation of the tire building machine 20 and an equal distance from the center-line of the expandable tire building drum 18, a position as shown in FIG. 7.

Figure 9:
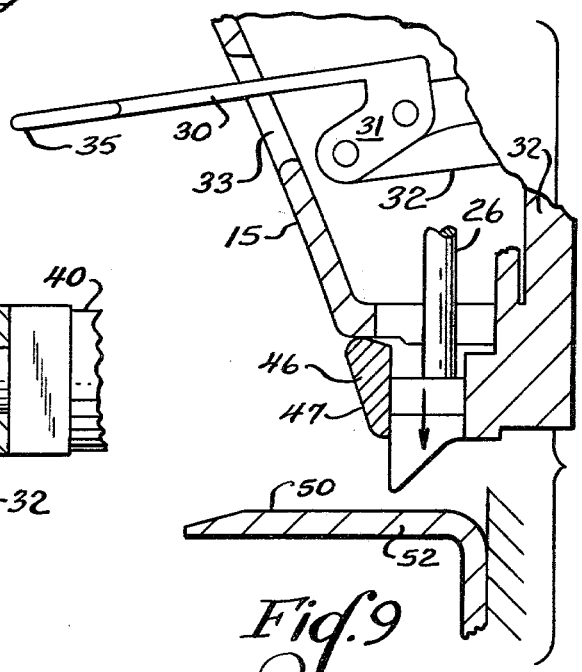
FIG. 9 is a fragmentary axial cross-sectional view of the retractable bead setter assembly illustrating the positioning of the first segment element axially inwardly adjacent the outer surface of the annular bead fixture ring for receipt of the bead and/or bead and filler material for the start of the cycle of operation in accordance with the present invention.

After the bead and filler material 57 has been firmly clamped and retained by the clamp lock means 21 on the tire building machine, the first segment elements 23 are moved axially from their inward extended position to their outward retracted position and the hinged paddles or second elements are radially and axially moved to their outward retracted position to thereby release its grip on the bead and/or bead and filler material, on the expanded bead clamp lock means, the position as shown by the dotted arrows in FIG. 7. Thereafter, the retractable bead setter assembly is returned axially outwardly to a position surrounding the outer annular surface 50 of the stationary annular bead fixture ring 52, a position as shown in FIG. 8. Then, the first segment elements 22 are moved axially inwardly adjacent the outer surface 50 of the stationary annular bead fixture ring 52 to ready the tire building machine for the placement of a bead and/or a bead and filler material thereon for the next cycle of operation, the position as shown in FIG. 9.

What has been described is a novel and useful retractable bead setter assembly which provides an apparatus for predeterminedly positioning the bead and/or the bead and filler material in an inward bead set position over the expanding clamp lock means of a tire building machine. The precise location of the bead and/or the bead and filler material in the predetermined inward bead set position is accomplished by the firm engagement and holding of the bead or the bead portion of the bead and filler material and the precise inward axial movement of the retractable bead setter assembly with respect to the clamp lock means. The proper alignment of the bead and/or the bead and filler material with respect to the expanding clamp lock means of the tire building machine in the production of tires having beads parallel to each other and uniformly positioned equal distance from the center-line of the tire and insures consistent manufacture of uniform and cylindrical tires.

We claim:

1. Bead locating apparatus for use with a tire building machine having clamp lock means to lock the tire carcass material to a bead and/or bead and filler material, including in combination:
   a plurality of first segment elements movable at least radially,
   a plurality of second segment elements movable both radially and axially, and
   whereby said bead or said bead portion of the bead and filler material is gripped firmly between said first segment elements and said second segment elements with said first and said second segment elements positioned in circumferential relation to one another with at least portions thereof overlapping and positioned perpendicular to the axis of rotation of the tire building machine as said clamp lock means lock the tire carcass material to the bead and/or bead and filler material.

2. The apparatus in accordance with claim 1 wherein said first segment elements are positioned, with respect to the tire building machine, axially outwardly from the bead portion of the bead and filler material and said second segment elements are positioned with respect to said tire building machine axially inwardly from said bead portion of the bead and filler material.

3. The apparatus in accordance with claim 1 wherein said bead locating apparatus is mounted upon ply turn-up pusher means.

4. The apparatus in accordance with claim 1 wherein said first segment elements are arcuate shaped and having an edge projection portion thereon.

5. The apparatus in accordance with claim 1 wherein said second segment elements are T-shaped and pivotally mounted to said bead locating apparatus.

6. The apparatus in accordance with claim 1 wherein each of said first and said second segment elements are coupled to piston means for movement thereof.

7. The apparatus in accordance with claim 3 wherein said ply turn-up bag pusher means includes an annular hub member mounted therein to extend the surface of said ply turn-up bag pusher means.

8. The method of locating beads or beads and filler material in a tire building apparatus having bead clamp means to lock the tire carcass material to the bead or to the beads and filler material, comprising the steps of:
   placing the beads or beads and filler material over bead fixture rings and substantially against a plurality of first segment elements movable at least radially, with said beads being substantially concentric to said first segment elements,
   moving radially and axially a plurality of second segment elements to grip firmly the beads or the bead portion of the beads and filler material against said first segment elements with said first and said second segment elements positioned in circumferential relation to one another with at least portions thereof overlapping,
   positioning said beads or said bead portion of said beads and filler material over said clamp lock means on said tire building apparatus,
   expanding radially the bead clamp means to lock the tire carcass material to the beads,
   retracting both said first and said second segment elements at least radially, and
   returning said first and said second elements to the original first position over said bead fixture ring.

9. The method of locating beads or beads and filler material in accordance with claim 8 further including the step of moving radially inwardly said plurality of first segment elements adjacent said bead fixture rings for the next cycle of operation.

* * * * *